G. R. FAIRCHILDS.
INDUSTRIAL TRUCK.
APPLICATION FILED MAY 18, 1918.
1,311,333.
Patented July 29, 1919.
3 SHEETS—SHEET 1.
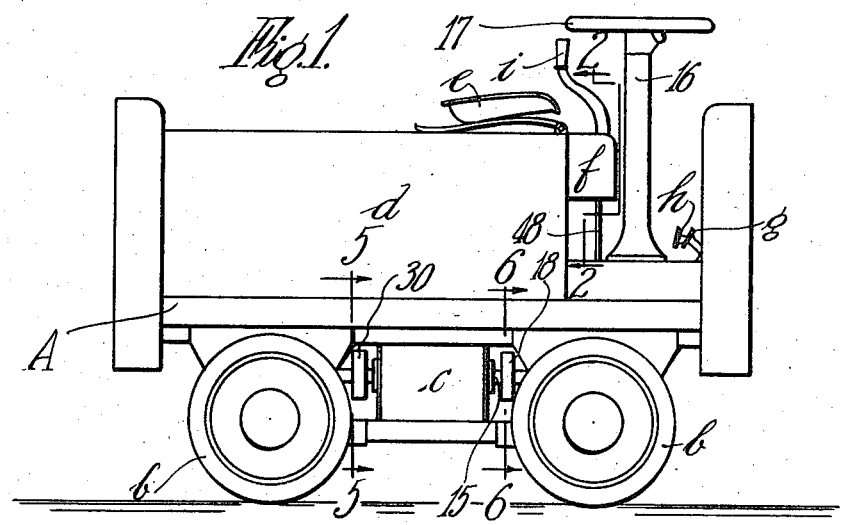
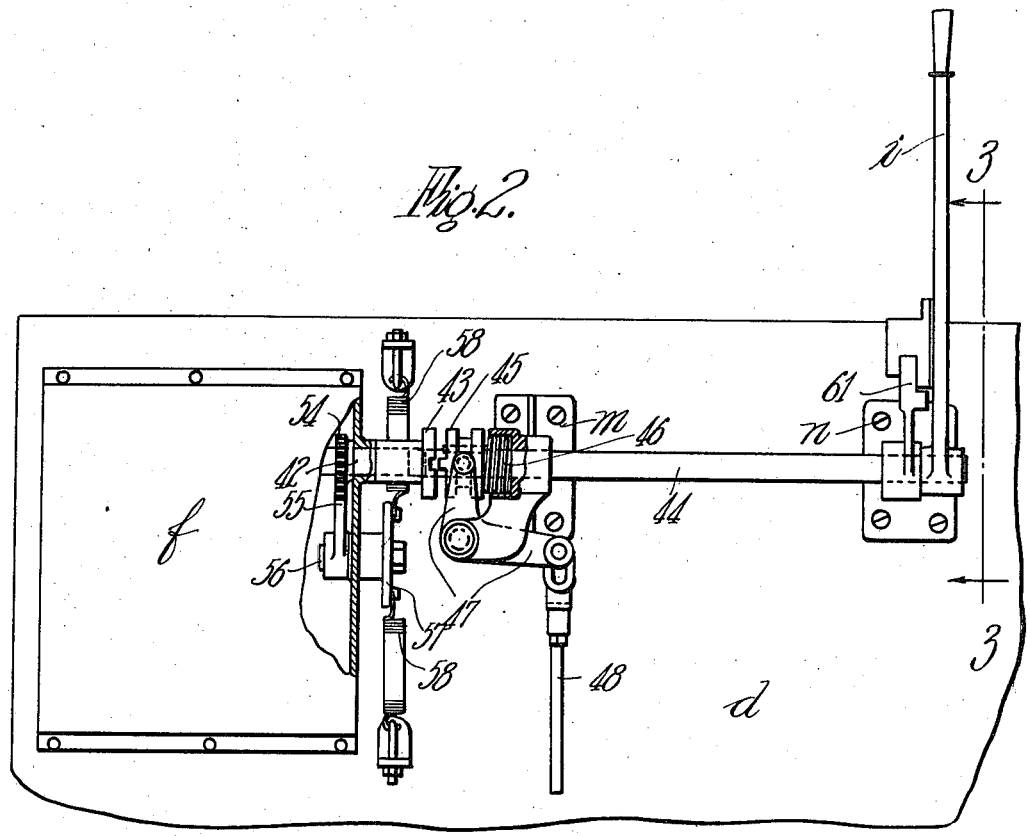
INVENTOR.
George R. Fairchilds
BY Chapin & Neal
ATTORNEYS.

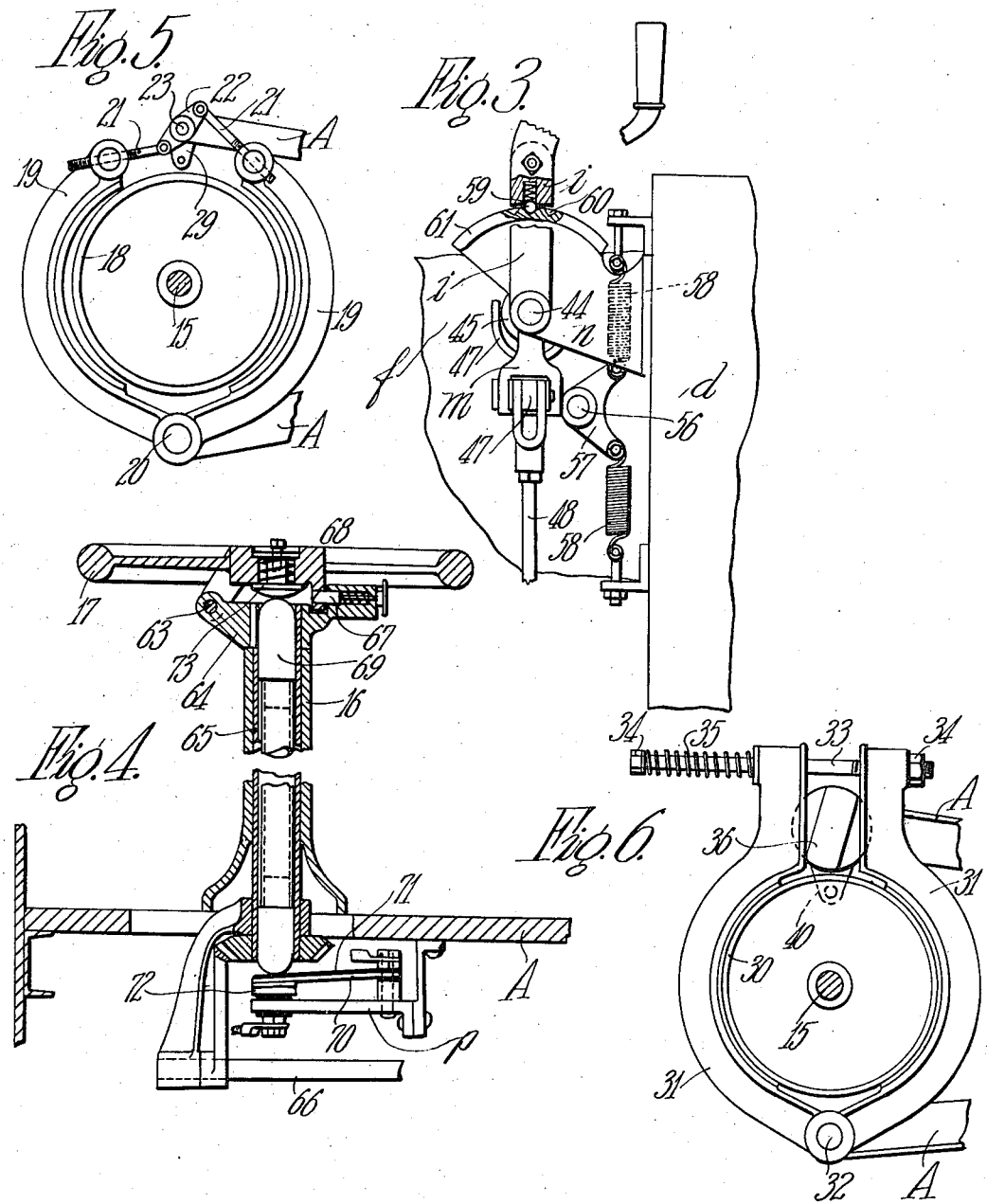

G. R. FAIRCHILDS.
INDUSTRIAL TRUCK.
APPLICATION FILED MAY 18, 1918.
1,311,333.
Patented July 29, 1919.
3 SHEETS—SHEET 3.
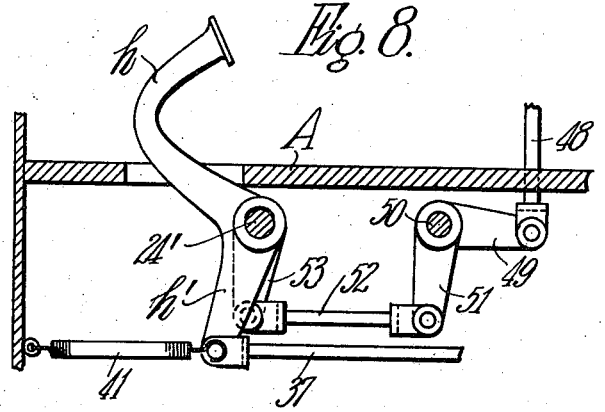
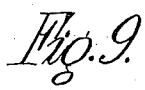
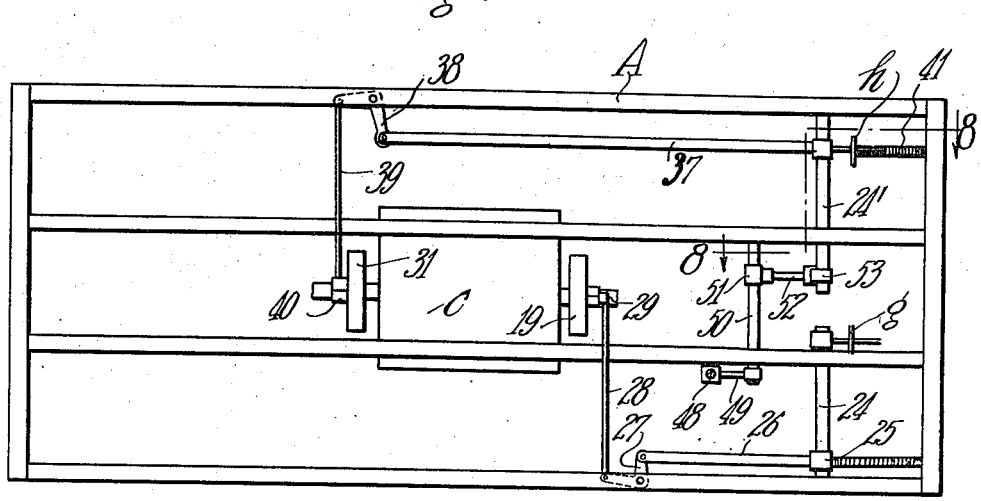
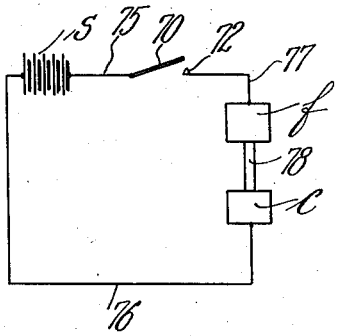
INVENTOR.
George R. Fairchilds.
BY Chapin + Neal.
ATTORNEYS.

UNITED STATES PATENT OFFICE.

GEORGE R. FAIRCHILDS, OF HOLYOKE, MASSACHUSETTS, ASSIGNOR TO J. LEWIS WYCKOFF, EDWARD N. WHITE, AND GEORGE F. JENKS, TRUSTEES, ALL OF HOLYOKE, MASSACHUSETTS, DOING BUSINESS AS THE COWAN TRUCK COMPANY.

INDUSTRIAL TRUCK.

1,311,333.     Specification of Letters Patent.     Patented July 29, 1919.

Application filed May 18, 1918. Serial No. 235,373.

*To all whom it may concern:*

Be it known that I, GEORGE R. FAIRCHILDS, a citizen of the United States of America, residing at Holyoke, in the county of Hampden and State of Massachusetts, have invented certain new and useful Improvements in Industrial Trucks, of which the following is a specification.

This invention relates generally to improvements in self-propelled vehicles and more particularly to apparatus for safeguarding and controlling the operation of such vehicles.

While the invention is capable of general application and is largely independent of the particular type of vehicle employed, it finds one advantageous and commercially important application in self-propelled vehicles of that type intended for operation in relatively congested localities. For example, the invention is particularly suitable for the so-called industrial trucks or tractors. Such vehicles are intended for service in mills, freight-houses, railway stations, and like localities, wherein the vehicle must oftentimes haul, back, and turn its load in narrow areas frequently congested by other traffic or otherwise. With such vehicles, it is especially important to provide adequate and effective safeguards against accident due to the increased dangers in operating vehicles in such localities.

I am aware that means have been proposed whereby operation of a self-propelled vehicle is prevented unless the driver is in position in his seat. Such means are intended to insure that the driver is present before the vehicle can be operated, but they operate by the weight of the driver, and no particular effort is required on his part, and it is sufficient that he be physically present as manifested by his weight. Any other weight would be as effective as that of the driver, and the present invention aims to insure not only that the operator is physically present but also that he is mentally alert and in readiness to operate the vehicle with that degree of care which is essential to his own safety as well as that of other persons and property.

I am also aware that means have been proposed whereby the controller of the vehicle is automatically returned to neutral position and a brake automatically applied whenever pressure on a member, such as a pedal, is relaxed. Such means, however, operate to return the controller through engagement with its operating handle, and the latter, being usually so disposed as to offer temptation to the mischievously or curiously inclined, may be operated and the brakes released without great difficulty and without insuring that an operator is present in the vehicle. Such means do not afford the foolproof safeguards desired against careless operation of the vehicle, and this invention is concerned, among other things, with improvements which effectively safeguard the operation of the vehicle and render it as nearly foolproof as possible.

An object of this invention is to provide in a self-propelled vehicle, of the type which includes a suitable power plant, braking means, a mechanism to facilitate gradual acceleration of the vehicle by the power plant, and a manually-operable lever to actuate the mechanism—a device which must constantly be held in one position to permit operation of the vehicle and which is operable conveniently only by muscular exertion on the part of the operator as distinguished from operation by the application of dead weight, said device being automatically operable whenever such exertion is relaxed to apply the brakes, render the power plant ineffective to propel the vehicle and return the mechanism to neutral or off position, whereby the vehicle may be automatically stopped and absolutely prevented from operation until the operator has moved the device to its first-named position, the construction being such that said lever is disconnected from said mechanism.

Another object of the invention is to provide in a self-propelled vehicle and in combination with a device of the class above-mentioned, mechanism to facilitate gradual acceleration of the vehicle, a manually-operable lever to actuate such mechanism, and means to automatically move such mechanism, independently of said lever, to neutral or off position whenever the operator relaxes his effort on said device and to disconnect said lever from the mechanism.

Another object of the invention is to provide in a vehicle of the class described, a steering column and tiltable steering wheel so located with relation to the driver's seat that the driver must tilt the wheel in order to enter or leave his seat, together with means operable by the tilting of the steering wheel to render the power plant of the vehicle ineffective to propel the latter.

The invention broadly and in one important aspect has for its object a combination in a self-propelled vehicle of a steering device, a power controlling device, and an automatic braking device associated together to the end that the power controlling device is rendered effective or ineffective according to the manipulations of either the steering device, the braking device or both as the case may be to insure the vehicle against careless, accidental, or deliberate mismanagement.

Other objects and advantages will appear in the following description and in the appended claims.

The invention, in an embodiment at present preferred, is shown for illustrative purposes in the accompanying drawings, in which—

Figure 1 is a general side elevational view of a truck embodying the invention;

Fig. 2 is an enlarged fragmentary cross-sectional view taken on the line 2—2 of Fig. 1;

Fig. 3 is a fragmentary sectional elevational view taken on the line 3—3 of Fig. 2;

Fig. 4 is a sectional elevation taken through the steering column of the truck;

Figs. 5 and 6 are enlarged cross-sectional views taken on the lines 5—5 and 6—6, respectively, of Fig. 1 showing, respectively, the service and emergency brake mechanisms;

Fig. 7 is a diagrammatical plan view, illustrative of the operating connections between the brake mechanisms and their operating pedals;

Fig. 8 is a fragmentary sectional elevation taken on the line 8—8 of Fig. 7; and Fig. 9 is a wiring diagram of the truck.

The invention is capable of general use with various types of self-propelled vehicles. For the purpose of illustrating one type of vehicle with which the invention may be employed, a truck A (Fig. 1) has been shown. Truck A is of the type known as an industrial truck and is particularly intended for service in congested places, as in mills, freight houses, railroad stations, and the like. The invention is particularly suitable for trucks of this class, and accordingly such trucks are in a measure preferred in the illustration of the invention, since they need, on account of their use in congested localities, safeguards and precautionary measures of a fool-proof nature, such as are provided by the present invention.

The truck A is provided with four suitable wheels $b$, and, in the illustrated embodiment of the invention, all four wheels are arranged to be driven from a power shaft 15 by means of suitable connections (not shown). Shaft 15 is the main power shaft of the truck, and in this instance is driven by a suitable electric motor $c$, which may be supplied from storage batteries contained within the box-like compartment $d$ of truck A. Upon the fore end of the battery compartment $d$ is located the driver's seat $e$. The steering column and steering wheel are represented at 16 and 17, respectively, and there are provided suitable connections (not shown but well known by those skilled in the art) by means of which all four wheels $b$ may be steered, or, if desired, the truck may be steered in other well-known ways.

The control apparatus comprises, in addition to the steering wheel 17, a controller $f$ for the electric motor $c$ and service and emergency brakes which are adapted to be operated by foot pedals $g$ and $h$, respectively. The controller $f$ may be of any of the known types capable of permitting gradual acceleration of motor $c$ in either forward or reverse directions. Such controllers are too well known to require further description herein, and, for the present purposes, it will suffice to state that the handle $i$ of controller $c$ is shown in "neutral" or "off" position in Fig. 1 and that, when thrown forwardly from such position, suitable connections will be made to actuate motor $c$ and propel truck A forwardly, and, when handle $i$ is moved rearwardly, the truck will be propelled rearwardly. The controller $f$ constitutes one form of a manually-operable mechanism capable of causing gradual acceleration of the truck.

The service brake is designed to operate upon a drum 18 fixed to the power shaft 15. As shown in Fig. 5, the drum 18 is substantially encompassed by two suitable brake shoes 19 hinged together and to frame A at 20. The free ends of shoes 19 are connected by adjustable rods 21 to an arm 22 which is fixed to a rod 23. The latter is disposed intermediate the two rods 21 so that an oscillation of the rod 23 in a counterclockwise direction will draw the shoes 19 toward one another and against drum 18 in an obvious manner. The service brake foot pedal $g$ is fixed to a shaft 24 (Fig. 7), and a lever 25, also fixed to shaft 24, is connected by a rod 26 to one arm of a bell-crank lever 27 (Fig. 7). The other arm of the latter is connected by a rod 28 to a lever 29 which, as indicated in Fig. 5, is fixed to shaft 23 described. The connections just described have been shown merely in diagrammatical form in Fig. 7, and any suitable connections may be employed which are arranged so that a forward push on pedal $g$ will cause the shoes 19 to grip drum 18, and a release of the pedal g will cause the drum 18 to be released. The invention is independent of the particular type of service brake employed, but one suitable type has been described for illustrative purposes to assist in disclosing the operation of the invention.

The emergency brake is designed to operate upon a drum 30 fixed to shaft 15 in the location shown in Fig. 1. The emergency brake, as shown in Fig. 6, comprises two suitable brake shoe members 31, which are hinged together and to frame A at 32. Loosely extending through the free ends of members 31 is a rod 33 which carries adjustable nuts 34 and a spring 35, arranged between one of the nuts and one member 31, the other nut being held in engagement with the other member 31 by force of spring 35. The arrangement is such that the spring 35 tends to force the shoes 31 against drum 30, and it is sufficiently powerful to force shoes 31 together to prevent effective rotation of drum 30. It will be obvious that the emergency brake is designed to automatically grip its brake drum and must needs be constantly held in released position to permit operation of the truck. A "spreader" cam 36 is disposed between the upper ends of shoes 31, and, when turned, is arranged to spread the shoes apart against the force of springs 35 and release drum 30 for rotation. Referring to Fig. 7, the emergency brake foot pedal h is fixed on a shaft 24′ and has a depending extension h′ (Fig. 8) which is connected by a rod 37 (see Fig. 7) to one arm of a bell-crank lever 38. The other arm of the latter is connected by a rod 39 to an arm 40 fixed on the described spreader cam 36, as shown in Fig. 6. Thus, a forward push on pedal h will turn cam 36 and spread the brake shoes 31, which otherwise are held against the drum 30, as shown in Fig. 6. A spring 41 acts on rod 37, as shown in Fig. 8, to hold the pedal h and cam 36 in the positions shown in Figs. 8 and 6, respectively.

The operation of the controller f is controlled by the emergency brake pedal h by means which will now receive consideration. Referring to Fig. 2, the controller handle i is not fixed directly to the main operating shaft of the controller f, as is generally customary. The main operating shaft of the controller is shown at 42 and on the outer end thereof is fixed a clutch element 43. Rotatably supported in spaced brackets m and n and in axial alinement with shaft 42 is a shaft 44 one end of which is disposed closely adjacent the outer end of shaft 42 and carries a circumferentially-grooved clutch element 45 to mate with the element 42. The element 45 is slidably keyed to shaft 44 and is urged toward the element 43 by a spring 46. The arrangement is such that with the clutch elements 43 and 45 in mating engagement, the shafts 44 and 42 turn as one to move the usual devices (not shown) within the controller f.

The controller handle i is fixed to shaft 44 and may be rendered ineffective to operate the controller f by the disengagement of the clutch elements 43 and 45. Such disengagement may be accomplished automatically so far as the intent of the operator is concerned by connections between the slidable clutch element 45 and the emergency brake-operating pedal h. Thus, a bell-crank lever 47, which is pivotally mounted intermediate its ends in bracket m, has one arm forked, as best shown in Fig. 3, to engage in the circumferential groove of clutch element 45. The other arm of bell-crank lever 47 is pivotally connected to the upper end of a rod 48 which, in turn, is pivotally connected at its lower end (see Fig. 8) to an arm 49 fixed on a rock-shaft 50. Another arm 51, also fixed on shaft 50, is connected by a rod 52 to an arm 53 fixed on the described shaft 24′, to which the operating pedal h is likewise attached, as already described. The spring 41 tends to hold pedal h in released position, as illustrated, and thus operates, when pedal h is released, to turn shaft 24′ and thus arms 49, 51 and 53 in a clockwise direction, as viewed in Fig. 8, with the result that rod 48 is pulled downwardly and bell crank lever 47 is swung to pull the clutch element 45 to the right (Fig. 2) against the force of spring 46 to disengage the clutch elements.

With the clutch elements disengaged, as described and as shown in Fig. 2, the controller handle i may be moved without, however, turning shaft 42. The operator no longer can operate the controller, but should the disengagement of the mating clutch elements occur at a time when the controller shaft 42 is in other than a neutral position, trouble might occur. It is therefore desired to not only prevent operation of the controller but also to insure that the controller is moved to neutral or off position whenever the operator releases the handle i. To accomplish this result, a gear 54 is fixed on the described controller shaft 42, and in mesh with the gear is a segmental gear 55 which is fixed on a stub-shaft 56, all as shown in Fig. 2. The shaft 56 extends through the controller casing and on the outer end of the shaft a rocker arm 57 is suitably fixed intermediate its ends. A spring 58 connects the upper extension of rocker arm 57 to a fixed bracket thereabove and a like spring connects the lower extension of arm 57 to a fixed bracket therebelow, all as clearly shown in Fig. 3. The springs are preferably mounted for adjustment as to tension, as indicated, and are so adjusted as to be of equal tension when the rocker arm 57 is in the position illustrated. In such position, the controller shaft 42 is in neutral or off position. It will therefore be apparent that any departure of the shaft 42 from normal position will cause an increase in tension in one spring 58 and a corresponding decrease in tension in the other spring, whereby there will be a force constantly urging the controller shaft 42 toward neutral position. Thus, whenever the clutch elements 43 and 45 are disengaged, as already described, the controller shaft 42, if in other than its neutral position, will be automatically returned to such position.

It is also to be noted that with the clutch elements 43 and 45 in mating engagement, the force of either spring 58 acting to return the controller shaft 42 to neutral position, is sufficient to turn the shaft 44 and the controller handle $i$. As shown in Fig. 3, the controller handle $i$ is provided with a spring-pressed detent 59 which is engageable in any of a plurality of notches 60 in a segment 61 fixed to or forming part of the bracket $n$. The engagement of the detent 59 and notches 60 presents but a relatively small resistance to the movement of handle and the springs 58 readily move the handle $i$ despite such engagement. Thus, the operator must constantly hold handle $i$ in the desired position and a release of the handle will cause it to be automatically returned to neutral or off position. The detent 59 and notches 60 are provided only so that the operator may "feel" the steps of the controller and move the handle by the proper increments.

The steering apparatus requires further consideration inasmuch as it has a function in safeguarding the operation of the vehicle. As will be seen in Fig. 1, the steering wheel 17 and steering column 16 are so located with relation to seat $e$, that the operator is practically locked in position in his seat. The arrangement is such that it is extremely difficult for the operator to enter or leave the vehicle when wheel 17 is in the position shown. The wheel 17 is pivoted at 63 to a bracket 64 which, in turn, is fixed to a sleeve 65 rotatable in column 16, as shown in Fig. 4. The turning of sleeve 65 is made to effect steering of wheels $b$ in a well-known manner, illustrated in part by the bevel gear connection with shaft 66. The wheel 17 may be swung upwardly (at right angles to that position illustrated in Fig. 4) to permit free entrance and exit of the driver to and from seat $e$. The location of wheel 17 relatively to seat $e$ is purposely made such that it is assured that the driver will tilt wheel 17 in leaving his seat. Wheel 17 is releasably held in the illustrated position by a manually-retractable spring-pressed latch 67 which engages in an opening 68 in wheel 17.

Mounted on a bracket $p$ secured to frame A and suitably insulated therefrom as indicated, is a flexible switch blade 70, the outer end of which supports the lower end of plunger 69. The blade 70 is insulated from the plunger 69 by insulating material 71 and preferably the lower end of plunger 69 is made of similar material, such as fiber and the like, for example. A contact block 72 is also mounted upon and insulated from bracket $p$ and is disposed in the path of the outer end of blade 70. The upper end of plunger 69 is adapted to be engaged, as the steering wheel 17 is swung toward its illustrated position by a spring-pressed button 73 mounted centrally in wheel 17 for limited sliding movements. As the wheel finally moves into the position illustrated, the button 73 abuts the lower face of wheel 17 and moves the plunger 69 downwardly sufficiently to bring the blade 70 and contact 72 into engagement.

The contact 72 and blade 70 constitute a switch and, as shown in Fig. 9, this switch is interposed in the electrical circuit which includes the motor $c$, controller $f$ and a storage battery $s$, the latter, as already described, being housed within the compartment $d$ of the truck. No attempt has been made to show all of the electrical connections between the elements $c$, $f$, and $s$, inasmuch as these are not essential to an understanding of the invention. For the present purposes, all that is desired is to show an electrical circuit involving the elements $c$, $f$, and $s$ and to show that the switch, comprising the elements 70 and 72, is so located as to control this circuit independently of the controller $f$. Thus, a wire 75 connects the switch blade 70 to one terminal of the battery $s$, the other terminal of the latter being shown as connected to one terminal of the motor $c$ by a wire 76. The contact 72 is connected to the controller by a wire 77 and the controller $f$ to the motor $c$ by a cable 78 within which may be housed whatever wires are necessary. Rheostats or equivalent elements or in fact any other usual or desirable devices may be included within the electrical circuit described, but such have not been illustrated, for the above disclosure is sufficient to show that the switch 70, 72 controls the power plant of the truck independently of controller $f$ in the sense that a disengagement of members 70 and 72 will open the circuit to motor $c$ and render the latter ineffective to propel the vehicle.

The controller $f$ likewise constitutes a switch in the electrical circuit described and a switch which is capable of being opened automatically by the described mechanism whenever the brake pedal $h$ is released or whenever the controller handle $i$ is released.

The operation of the control apparatus will now be described. It should first be noted that, with the truck at rest and without a driver, the emergency brake is set so that the truck may be safely left driverless, even on a grade or incline, without danger. Furthermore the automatic setting of the emergency brake has caused the disconnection of the controller *f* from the handle *i*. The latter then, although capable of being moved back and forth, is no longer effective to operate the controller *f* so that movement of the handle *i* can cause no damage. Moreover, aside from preventing operation of the controller, the latter is automatically operated in the event of the release of the emergency brake by the means described so that the controller is returned to neutral or off position. Thus, the setting of the emergency brake functions not only to lock the truck wheels *b* but also to render the power plant of the vehicle ineffective to propel such wheels, as well as to render movements of the controller handle *i* useless. As an added safeguard, the steering wheel is so arranged that the driver must tilt it in order to conveniently leave his seat. Thus, presumably the truck is left with the wheel 17 tilted, in which case the switch 70, 72 causes an interruption in the motor circuit independently of that caused by the movement of the controller into neutral position.

Assuming that the driver desires to start the truck, he must first lift wheel 17, unless it has been left in such position, in order to conveniently get into the seat *e*. The mere physical presence of the driver in seat *e* does not, however, enable the truck to be started. That is to say, no reliance is placed upon the weight of the operator to operate devices which permit the truck to be started, for if such were the case, dead weight in seat *e* would be equally effective and the presence of an alert operator would by no means be insured. The present apparatus is characterized in that it requires not only the physical presence of a driver but also a driver who is mentally present and alert as well. Thus the driver must be in seat *e* in order to conveniently manipulate the steering wheel, brake pedals and controller handle. He must also move wheel 17 into the illustrated position, whereby he becomes virtually held and almost locked in seat *e*. Such movement of the wheel 17 will close the switch 70, 72, but even now the truck cannot be started. The driver has to also release the emergency brake and thus allow wheels *b* to be turned. Still, however, such wheels cannot yet be turned by motor *c* until the controller is connected to its operating handle *i* and it is a particular point of the present construction that such connection cannot be made until the controller handle has been brought by the operator into neutral position. Thus, by no possibility can damage, as a sudden application of current to motor *c* and a like sudden movement of the vehicle, be caused, no matter in what position the controller handle is held, for unless the latter is in neutral position, the clutch element 45 cannot be interlocked with its mating element 42, as will be obvious from an inspection of Fig. 2. If handle *i* is already in neutral position, it will become automatically coupled to the controller, but otherwise the driver must first move the handle to neutral position to permit of such coupling.

Now, in the operation of the truck, the operator must constantly exercise muscular effort to hold pedal *h* in released position, and the pedal is so arranged that it cannot readily be operated except by such effort. Should he fail in the exercise of such effort, the brakes will automatically be set and the controller returned to neutral position so that the truck will be stopped independently of the driver's plan or intent. Likewise, the driver must at all times exert effort on the handle *i* to hold it in the desired position, except when the handle is in neutral position. A release of the handle by the driver means that the handle and controller will be returned to neutral. The arrangement whereby the operator must exercise effort on the handle *i* and pedal *h* is an important feature of the present invention inasmuch as it best assures the presence of a driver who is mentally alert, vigilant, and in competent condition to operate the truck with safety.

The invention has been disclosed herein for illustrative purposes, but the scope of the invention is defined by the appended claims rather than by the foregoing description.

What I claim is—

1. The combination in a self propelled vehicle having operable driving means, of brake mechanism automatically operable to prevent movement of the vehicle, releasing means for said mechanism including a member movable in a substantially horizontal direction to release the mechanism, said member being so located as to be conveniently operated only by physical exertion on the part of the operator, and means controlled by said releasing means to render the driving means ineffective to propel the vehicle, except when the braking mechanism is released.

2. The combination in a self-propelled vehicle with its driving means, of a mechanism movable from a neutral position to other positions to permit gradual acceleration of the vehicle in either direction, a manually-operable lever to actuate such mechanism, means arranged to be held in one position by physical exertion on the part of the driver of the vehicle and movable automatically to another position on failure of such exertion, and mechanism operable as said means moves to its last-named position to automatically move said mechanism to neutral position independently of said lever.

3. The combination in a self-propelled vehicle with its driving means, of mechanism movable from a neutral position to other positions to permit gradual acceleration of the vehicle in either direction, a manually-operable device to actuate said mechanism, means arranged to be held in one position by physical exertion on the part of the driver of the vehicle and movable automatically to another position on failure of such exertion, mechanism operable as said means is moved to its last-named position to disconnect said lever and mechanism, and means to move said mechanism to neutral position.

4. The combination in a self-propelled vehicle with its driving means, of a mechanism movable from a neutral position to other positions to permit gradual acceleration of the vehicle in either direction, a manually-operable device to actuate said mechanism, braking means automatically operable to prevent movement of the vehicle, means arranged to be moved and held by physical exertion on the part of the driver of the vehicle to release the braking means, and means automatically operable independently of said device to move said mechanism into neutral position when the exertion on said releasing means is relaxed.

5. In a self-propelled vehicle, brake mechanism automatically operable to stop the vehicle, releasing means for such mechanism arranged to require a constant muscular exertion on the part of the driver of the vehicle to permit operation of the latter, a power plant for the vehicle, a controller for such power plant, yieldable means to automatically hold the controller in neutral position, a manually-operable means to actuate said controller and capable of being disconnected therefrom, and connections between said releasing means and last-named means to permit movement of the latter at all times and to disconnect the controller from said manually operable means whenever the exertion on the releasing means is relaxed.

6. In a self-propelled vehicle, in combination with its driving means, steering means for the vehicle including a steering post and steering wheel, a driver's seat arranged with relation to said wheel to prevent the driver from readily entering or leaving the seat, said wheel being movable relatively to said post to another position to permit the driver to freely enter or leave said seat, and means operable when said wheel is moved to such position to render the driving means ineffective to propel the vehicle.

7. In a self-propelled vehicle the combination of a steering device, a power controlling device, and an automatic braking device, mechanism associated with the braking device and constructed to require muscular effort of the operator to hold such braking device from its automatic function, means associated with the steering device to render the power-controlling device ineffective when such means is in one position and effective when such means is in another position, and an operator's seat arranged close to such means to cause the operator to move the latter to the first-named position when getting out of the seat and to the second-named position when in the seat to operate the vehicle.

8. In a self-propelled vehicle, the combination of a steering device, a power controlling device, and an automatic braking device, mechanism associated with the latter and constructed to require muscular effort of the operator to hold such braking device from its automatic function, means associated with said mechanism and the power controlling device to render the latter effective when the muscular effort is applied to said mechanism by the operator and automatically ineffective when such effort is relaxed.

9. In a self-propelled vehicle, the combination of a steering device, a power controlling device, and an automatic braking device, and means associated with all three devices to render the power controlling device effective or ineffective in accordance with the operator's manipulations of the steering and braking devices, whereby operation of the vehicle is safeguarded.

GEORGE R. FAIRCHILDS.